United States Patent
Cairns et al.

(10) Patent No.: US 10,895,140 B2
(45) Date of Patent: Jan. 19, 2021

(54) COMPOSITIONS AND METHODS FOR CONTROLLED DELIVERY OF ACID

(71) Applicant: Saudi Arabian Oil Company, Dhahran (SA)

(72) Inventors: Amy J. Cairns, Houston, TX (US); Katherine L. Hull, Houston, TX (US); Mohammed Sayed, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 15/946,447

(22) Filed: Apr. 5, 2018

(65) Prior Publication Data

US 2018/0291720 A1    Oct. 11, 2018

Related U.S. Application Data

(60) Provisional application No. 62/644,899, filed on Mar. 19, 2018, provisional application No. 62/483,273, filed on Apr. 7, 2017.

(51) Int. Cl.
| | |
|---|---|
| *E21B 43/22* | (2006.01) |
| *C09K 8/60* | (2006.01) |
| *E21B 43/16* | (2006.01) |
| *E21B 43/28* | (2006.01) |
| *C09K 8/84* | (2006.01) |
| *C09K 8/528* | (2006.01) |
| *C09K 8/54* | (2006.01) |
| *C09K 8/72* | (2006.01) |
| *E21B 43/20* | (2006.01) |

(52) U.S. Cl.
CPC ............ *E21B 43/283* (2013.01); *C09K 8/528* (2013.01); *C09K 8/54* (2013.01); *C09K 8/72* (2013.01); *C09K 8/845* (2013.01); *E21B 43/166* (2013.01); *E21B 43/20* (2013.01)

(58) Field of Classification Search
CPC ...... C09K 2208/26; C09K 8/68; C09K 8/685; C09K 8/887; C09K 8/62; C09K 8/90; C09K 2208/32; E21B 43/267; E21B 43/26; E21B 21/00; E21B 37/06; E21B 21/068; E21B 36/008; E21B 43/16

See application file for complete search history.

(56) References Cited

U.S. PATENT DOCUMENTS

| | | |
|---|---|---|
| 3,828,854 A | 8/1974 | Templeton et al. |
| 3,868,998 A | 3/1975 | Lybarger et al. |
| 3,948,324 A | 4/1976 | Lybarger |
| 4,324,669 A | 4/1982 | Norman et al. |
| 4,368,136 A * | 1/1983 | Murphey ............... C08L 63/00 507/211 |
| 4,502,540 A | 3/1985 | Byham |
| 4,737,296 A | 4/1988 | Watkins |
| 5,964,295 A | 10/1999 | Brown et al. |
| 6,207,620 B1 | 3/2001 | Gonzalez et al. |
| 6,431,279 B1 | 8/2002 | Zaid et al. |
| 7,166,560 B2 | 1/2007 | Still et al. |
| 7,753,123 B2 | 7/2010 | Fuller |
| 7,947,629 B2 | 5/2011 | Fuller |
| 9,512,350 B2 | 12/2016 | Vo |
| 9,725,643 B2 | 8/2017 | De Wolf et al. |
| 2008/0017382 A1 | 1/2008 | Harris et al. |
| 2008/0139412 A1 | 6/2008 | Fuller |
| 2009/0025933 A1 | 1/2009 | Garcia-Lopez de Victoria et al. |
| 2009/0042750 A1 | 2/2009 | Pauls et al. |
| 2009/0131285 A1 | 5/2009 | Wang et al. |
| 2009/0286701 A1 | 11/2009 | Davidson |
| 2014/0296113 A1 | 10/2014 | Reyes et al. |
| 2015/0080271 A1 | 3/2015 | De Wolf et al. |
| 2016/0244659 A1 | 8/2016 | Shahin et al. |
| 2016/0298024 A1 | 10/2016 | Panga et al. |
| 2019/0010385 A1 | 1/2019 | Sayed et al. |
| 2020/0116001 A1 | 4/2020 | Sayed et al. |

FOREIGN PATENT DOCUMENTS

| | | |
|---|---|---|
| CN | 102399550 A | 4/2012 |
| CN | 102899012 A | 1/2013 |
| CN | 105950129 A | 9/2016 |
| EP | 0 181 210 A2 | 5/1986 |
| WO | WO-94/25731 A1 | 11/1994 |
| WO | WO-2004/007905 A1 | 1/2004 |
| WO | WO-2013/189842 A1 | 12/2013 |
| WO | WO-2014/099667 A1 | 6/2014 |
| WO | WO-2015/030801 A1 | 3/2015 |
| WO | WO-2015/038153 A1 | 3/2015 |
| WO | WO-2015/154977 A1 | 10/2015 |
| WO | WO-2015/187178 A1 | 12/2015 |
| WO | WO-2016/018374 A1 | 2/2016 |
| WO | WO-2016/043703 A1 | 3/2016 |
| WO | WO-2016/180664 A1 | 11/2016 |
| WO | WO-2018/187565 A1 | 10/2018 |
| WO | WO-2018/237237 A1 | 12/2018 |
| WO | WO-2020/076993 A1 | 4/2020 |

OTHER PUBLICATIONS

International Search Report for PCT/US2018/026247, 4 pages (dated Jun. 19, 2018).

International Search Report for PCT/US2018/038937, 4 pages (dated Oct. 8, 2018).

Kankaria, S. et al., Matrix Acidizing of Carbonate Rocks Using New Mixtures of HCl/Methanesulfonic Acid. Prepared to be Presented at the SPE International Conference on Oilfield Chemistry held in Montgomery, Texas, USA, SPE-184528-MS (Apr. 3-5, 2017).

(Continued)

*Primary Examiner* — Zakiya W Bates
(74) *Attorney, Agent, or Firm* — Choate, Hall & Stewart LLP; Charles E. Lyon

(57) ABSTRACT

Compositions and methods for the controlled delivery of acid to a desired location. In some embodiments, methods for in situ acid stimulation of a subterranean formation that contains a hydrocarbon reservoir comprise contacting the formation with an aqueous fluid that comprises (a) an ammonium salt capable of being oxidized to produce acid and (b) an oxidizing agent capable of oxidizing the ammonium salt, where the ammonium salt and oxidizing agent react to produce an acid.

27 Claims, No Drawings

(56) References Cited

OTHER PUBLICATIONS

Le Page, J.N. et al., An Environmentally Friendly Stimulation Fluid for High Temperature Applications. Presented at the SPE International Symposium on Oilfield Chemistry held in The Woodlands, Texas, USA, SPE-121709-MS (Apr. 20-22, 2009).

Mahmoud, M.A. et al., Stimulation of Carbonate Reservoirs Using GLDA (Chelating Agent) Solutions. Presented at the SPE Trinidad and Tobago Energy/Resources Conference held in Port of Spain, Trinidad, SPE-132286-MS (Jun. 27-30, 2010).

Mendelowski, T.; Gazda, A., New Method for acid treatment of deep deposits, Nafta (Katowice, Poland), 31(12): p. 36 (1975). English Machine Translation. No known English language copy.

Rabie, A.I. et al., Reaction of GLDA with Calcite: Reaction Kinetics and Transport Study. Presented at the SPE International Symposium on Oilfield Chemistry held in The Woodlands, Texas, USA, SPE-139816-MS (Apr. 11-13, 2011).

Reyath, S.N. et al., Determination of the Diffusion Coefficient of Methanesulfonic Acid Solutions with Calcite Using the Rotating Disk Apparatus. Presented at the SPE International Symposium on the Oilfield Chemistry held in The Woodlands, Texas, USA, SPE-173794-MS (Apr. 13-15, 2015).

Sayed, M and Cairns, A.J., A Low-Viscosity Retarded Acid System for Stimulation of High-Temperature Deep Wells, Offshore Technology Conference, Houston, Texas, USA, OTC-28838-MA, 20 pages (Apr. 30-May 3, 2018).

Written Opinion for PCT/US2018/026247, 7 pages (dated Jun. 19, 2018).

Written Opinion for PCT/US2018/038937, 7 pages (dated Oct. 8, 2018).

Hull, K. L. et al., Bromate Oxidation of Ammonium Salts: In Situ Acid Formation for Reservoir Stimulation, Inorg. Chem., 58:3007-3014 (2019).

International Search Report for PCT/US2019/055456, 5 pages (dated Dec. 16, 2019).

Written Opinion for PCT/US2019/055456, 9 pages (dated Dec. 16, 2019).

* cited by examiner

COMPOSITIONS AND METHODS FOR CONTROLLED DELIVERY OF ACID

TECHNICAL FIELD

This application relates to compositions and methods for the controlled delivery of acid, for instance to a subterranean formation.

BACKGROUND

It has been estimated that a significant portion of the world's oil and gas reserves lie in carbonate reservoirs with values estimated at 60% and 40%, respectively (Schlumberger Market Analysis, 2007). The mineralogy of these heterogeneous carbonate formations primarily consists of calcite, dolomite or combinations thereof. Production enhancement methods routinely rely on the use of suitable acid stimulation technologies owing to their proven success and efficiency towards dissolving calcium and magnesium-based carbonates. Several acid platforms have been proposed and are widely used by oil and gas operators to stimulate carbonate formations. These include but are not limited to use of strong mineral acids (for example, hydrochloric acid, HCl), gelled and emulsified acids, organic-based acids such as formic acid ($CH_2O_2$) and acetic acid ($C_2H_4O_2$) and combinations thereof. While these technologies are effective, improvements are needed, for instance to achieve deeper penetration of acid into a reservoir, or to minimize the amount of acid used, or both.

SUMMARY

There exists a need in the oil and gas industry but also in other industries, for instance the biomedical and semiconductor industries, for the controlled delivery of acid, whether inorganic or organic in nature, to site-specific locations as a means to remediate a wide range of challenges associated with, for example, the corrosive nature of acid, as well as difficulties and safety concerns associated with handling it. As noted above, the oil and gas industry uses acid systems to stimulate hydrocarbon reservoirs, for instance, carbonate reservoirs. Typically, the acid systems are used to create a more conductive flow path for oil or gas to flow, whether by creating wormholes via dissolution of the formation or by mitigating damage in the near well-bore region caused by the drilling process.

Carbonate formations consisting of calcite, dolomite, and the like, are typically stimulated using strong mineral acids, for instance, hydrochloric acid (HCl). In the field, treatment with HCl is often preferred because it reacts with calcite and dolomite to yield products that are readily soluble in water; hence formation damage is negligible. Additionally, an HCl acid system is very cost-effective and thus economically favorable. The longevity and practical application of this treatment however raises serious concerns from both a corrosion standpoint and because the rapid reaction kinetics (rock-HCl) causes the live acid to be spent quickly. As a result, large volumes of acid are required and even still, deeper penetration of live acid into the reservoir is not achieved. Other drawbacks include various safety concerns associated with the transfer and handling of corrosive acids at the well site, as well as undesired acid reactions occurring near the wellbore, causing corrosion to drilling equipment, tubing, and casing. Various alternative approaches have been proposed to address these challenges. These include, but are not limited to: (1) organic and synthetic acids, (2) gelled acids, (3) emulsified acids and (4) acid-producing enzymes.

In one aspect, the present application describes technologies relating to compositions and methods for the controlled delivery of an acid to a particular location in order to minimize certain challenges described herein. In some embodiments, a composition for the controlled delivery of an acid to a particular location comprises a composition capable of generating acid in situ at a desired location or time. In some such embodiments, compositions comprise a combination of one or more oxidizing agents, one or more salts, and optionally one or more chelants, as described in this application. In some embodiments, methods described in this application comprise controlled delivery of acid to a subterranean formation that contains a hydrocarbon reservoir, for instance a carbonate, sandstone, or shale formation. In some embodiments, controlled delivery of acid to a subterranean formation that contains a hydrocarbon reservoir reduces the occurrence of corrosion to drilling equipment, tubing, and casing associated with treatment with an acid. In some embodiments, controlled delivery of acid to a subterranean formation that contains a hydrocarbon reservoir allows for deeper penetration of acid into the formation than would be achieved otherwise.

In some embodiments, controlled delivery of acid to a subterranean formation that contains a hydrocarbon reservoir can mitigate formation damage incurred during the drilling process. In some embodiments, formation damage incurred during the drilling process can be filter cake damage. Filter cake damage can cause a reduction in the permeability in the near well-bore region leading to a decline in production. In some embodiments, in order to restore permeability, the damaged zone is treated by controlled delivery of acid in accordance with the methods of the present application. In some embodiments, the methods are used to dissolve filter cake damage that has propagated deep into a hydrocarbon reservoir. In some embodiments, filter cake damage is caused by carbonate formation. In some embodiments, filter cake damage is caused by calcium carbonate. In some embodiments, the present application describes a method of controlled acid delivery to a subterranean formation for treatment of drilling induced formation damage. In some embodiments, a treatment of drilling induced formation damage involves filter cake solvation. In some embodiments, treatment of drilling induced formation damage increases filter cake permeability. In some embodiments, treatment of drilling induced formation damage involves filter cake removal.

This application describes, among other things, methods for in situ acid stimulation of a subterranean formation that contains a hydrocarbon reservoir, the method comprising contacting the formation with an aqueous fluid that comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

This application also describes, among other things, methods for in situ acid treatment of a subterranean formation selected from a water injection well, a gas injection well, a water disposal well, and a drill cuttings disposal well, the method comprising contacting the formation with an aqueous fluid that comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

This application also describes, among other things, aqueous fluids for in situ acid stimulation of a subterranean formation that contains a hydrocarbon reservoir, where the aqueous fluid comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

This application also describes, among other things, aqueous fluids for in situ acid treatment of a subterranean formation selected from a water injection well, a gas injection well, a water disposal well, and a drill cuttings disposal well, where the aqueous fluid comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

Various embodiments of the subject matter described in this application are set forth in the following detailed description and claims.

DETAILED DESCRIPTION

It is contemplated that systems, devices, methods, and processes of the present application encompass variations and adaptations developed using information from the embodiments described in the following description. Adaptation and/or modification of the membranes, methods, and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

The mention in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to the claimed subject matter.

As described herein, there exists a need in various industries for the controlled delivery of acid, whether inorganic or organic in nature, to site-specific locations as a means to remediate a wide range of challenges associated with, for instance, the corrosive nature of acid, as well as difficulties and safety concerns associated with handling it. One manner of controlling delivery of an acid to a site-specific location is by generating the acid in situ. As used in this application, "in situ" acid generation refers generally to the generation of acid "in one pot" where a reaction is intended to take place, as opposed to generating acid in one vessel and transferring it to a separate vessel for reaction. In some embodiments, in situ generation of acid comprises generating acid at a desired location where the acid is intended to react, for instance by generating acid in a subterranean reservoir downhole, as opposed to generating acid on the earth's surface and transferring it to a subterranean reservoir downhole. Accordingly, this application describes, among other things, methods for generating acid (for instance, via in situ generation) using compositions comprising a combination of one or more oxidizing agents, one or more salts, and optionally one or more chelants, as described in this application.

In some embodiments, compositions described in this application are useful in oil and gas applications, for instance for the stimulation of a subterranean formation. In some embodiments, the in situ methods may involve generating acid upon or after arriving at the formation, for example by delivering reagents described in this application to the formation via a coiled tubing or bullheading in the production tube, depending on whether the application is acid fracturing or matrix acidizing, respectively. In some embodiments, the acid is generated within the formation itself.

In some embodiments, the subterranean formation contains a hydrocarbon reservoir. In some embodiments, the subterranean formation comprises carbonates. In some embodiments, the subterranean formation comprises sandstone. In some embodiments, the subterranean formation comprises clastic sedimentary rock. For instance, in some embodiments, the subterranean formation comprises shale.

In some embodiments, compositions and methods described in this application are useful for acidizing a well formation, for instance water injection wells or disposal wells, or an injector, for instance to improve injectivity. The injector can be a water injector or a gas injector. The disposal well can be a water disposal well or a drill cuttings disposal well.

As compositions and methods described in this application can be useful in a variety of applications in which the controlled delivery of acid (for instance via in situ generation) is desired, applications of the compositions and methods described in this application are not limited to the oil and gas industry or to other industries contemplated in this application.

Compositions

Described in this application are, among other things, compositions useful for the controlled delivery of acid, comprising a combination of one or more oxidizing agents, one or more salts, and optionally one or more chelants, as described in this application. Exemplary oxidizing agents, salts, and optional components are described further infra.

In some embodiments, a composition comprises an aqueous fluid for the controlled delivery of acid, where the aqueous fluid comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

In some embodiments, a composition comprises an aqueous fluid for in situ acid stimulation of a subterranean formation that contains a hydrocarbon reservoir, where the aqueous fluid comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

In some embodiments, compositions described in this application do not comprise a tertiary amine or a compound that reacts to form a tertiary amine salt in situ. For instance, in certain embodiments, compositions described in this application do not comprise a trialkylamine such as trimethylamine, triethylamine, tri-n-propylamine, tri-n-butylamine, dimethyldodecylamine, or dimethyltetradodecylamine.

Oxidizing Agents

Compositions described in this application for the controlled delivery of acid (for instance, via in situ generation) comprise one or more oxidizing agents. In some embodiments, the one or more oxidizing agents is present in an aqueous fluid.

In some embodiments, an oxidizing agent comprises any agent capable of oxidizing an ammonium salt. In some embodiments, an oxidizing agent is an inorganic oxidizer. In some embodiments, an oxidizing agent comprises an agent selected from the group consisting of a peroxide, a persulfate salt, a permanganate salt, a bromate salt, a perbromate salt, a chlorate salt, a perchlorate salt, a iodate salt, a periodate salt, and mixtures thereof. In certain embodiments, an oxidizing agent is a bromate salt, for instance an alkali bromate salt. In certain embodiments, an oxidizing agent is or comprises sodium bromate. In some embodiments, an oxidizing agent is an organic oxidizer. In some embodiments, an oxidizing agent comprises an agent selected from the group consisting of paracetic acid and performic acid.

In some embodiments, an oxidizing agent is present in an aqueous fluid at a concentration in the range of 0.001 M up to saturation as measured at 20° C. In some embodiments, an oxidizing agent is present in an aqueous fluid at a concentration in the range of 0.05 M to 1.0 M, or 0.05 M to 0.5 M, or 0.05 M to 0.4 M, or 0.05 M to 0.3 M, or 0.1 M to 0.3 M. In some embodiments, an oxidizing agent is present in an aqueous fluid at a concentration in the range of 0.5 M to 10.0 M, or 0.5 M to 9.5 M, or 0.5 M to 9.0 M, or 1.0 M to 9.0 M, or 2.0 M to 9.0 M, or 3.0 M to 9.0 M, or 4.0 M to 9.0 M or 5.0 M to 9.0 M, or 6.0 M to 9.0 M, or 6.0 M to 8.0 M, or 6.5 M to 7.5 M. In some embodiments, an oxidizing agent is present in an aqueous fluid at a concentration in the range of 1.0 M to 4.0 M, or 1.0 M to 3.0 M, or 1.5 M to 3.0 M, or 2.0 M to 3.0 M In some embodiments, an oxidizing agent comprises a bromate salt such as sodium bromate and is present in an aqueous fluid at a concentration in a range of 0.001 M to 2.4 M. In some embodiments, an oxidizing agent comprises sodium bromate and is present in an aqueous fluid at a concentration in a range of 0.01 M to 2.4 M, or 0.01 M to 2.2 M, or 0.01 M to 2.0 M, or 0.01 M to 1.8 M, or 0.01 M to 1.6 M, or 0.01 M to 1.4 M, or 0.01 M to 1.2 M, or 0.01 M to 1.0 M, or 0.01 M to 0.8 M, or 0.01 M to 0.6 M, or 0.01 M to 0.4 M, or 0.01 M to 0.2 M, or 0.01 M to 0.1 M, or 0.01 M to 0.09 M, or 0.02 M to 0.09 M, or 0.03 M to 0.09 M, or 0.04 M to 0.09 M, or 0.05 M to 0.09 M, or 0.06 M to 0.08 M. In some embodiments, an oxidizing agent comprises sodium bromate and is present in an aqueous fluid at a concentration in a range of 0.1 M to 0.5 M, or 0.1 M to 0.4 M, or 0.1 M to 0.2 M, or 0.3 M to 0.4 M, or 0.15 M to 0.25 M.

In some embodiments, an oxidizing agent is provided in an encapsulated form, for instance to delay its release. Encapsulated oxidizing agents are commercially available and are known to those of ordinary skill in the art. Exemplary such oxidizing agents include sodium persulfate, potassium persulfate, potassium bromate, and the like.

In some embodiments, an oxidizing agent is characterized in that it requires a threshold temperature to react with a salt of a composition described in this application. For instance, in some embodiments, an oxidizing agent at 1 atmosphere pressure requires a threshold temperature of at least 65° C., 70° C., 75° C., 80° C., 85° C., 90° C., 95° C., 100° C., 110° C., 120° C., 130° C., or 140° C. in order to react with a salt of a composition described in this application. In some embodiments, an oxidizing agent at 1 atmosphere pressure is characterized in that it requires a threshold temperature in the range of 65° C. to 250° C. to react with a salt of a composition described in this application. In some embodiments, an oxidizing agent at 1 atmosphere pressure is characterized in that it requires a threshold temperature greater than ambient temperature to react with a salt of a composition described in this application.

In some embodiments, a threshold temperature can be reduced, for instance by adding an amount of acid to a composition.

Salts

Compositions described in this application for the controlled delivery of acid (for instance, via in situ generation) comprise one or more salts which provide a source of hydrogen. In some embodiments, the one or more salts is present in an aqueous fluid.

In some embodiments, a salt comprises an ammonium salt. In some embodiments, an ammonium salt comprises an anion which is an oxidation resistant anion. In some embodiments, the anion of an ammonium salt is selected based on its reactivity, as measured by the temperature at which the resulting ammonium salt can react with a particular oxidizing agent.

In some embodiments, an ammonium salt is selected based on the intended application. For instance, in embodiments where the intended application is the stimulation of a carbonate formation, it may be desirable to generate highly water soluble HCl as the in situ acid. In such instances, ammonium chloride may be selected as the ammonium salt. In other embodiments where the intended application is the stimulation of a sandstone formation, it may be desirable to generate an acid other than HCl in situ, and or in addition to for instance by selecting as the ammonium salt one or more of ammonium fluoride and ammonium chloride.

In some embodiments, an ammonium salt comprises an ammonium halide. In some embodiments, the ammonium halide comprises ammonium fluoride, ammonium chloride, ammonium bromide, ammonium iodide, and mixtures thereof. In some embodiments, an ammonium salt comprises ammonium fluoride. In some embodiments, an ammonium salt comprises ammonium hydrogen difluoride. In some embodiments, an ammonium salt comprises ammonium chloride.

In some embodiments, an ammonium salt comprises an anion that is also an oxidizing agent. For instance, in some embodiments, an ammonium salt comprises ammonium persulfate.

In some embodiments, an ammonium salt comprises a polyatomic anion such as sulfate, hydrogen sulfate, thiosulfate, nitrite, nitrate, phosphite, phosphate, monohydrogen phosphate, dihydrogen phosphate, carbonate, and combinations thereof. Other such polyatomic anions are known to those of skill in the chemical arts.

In some embodiments, an ammonium salt comprises one or more N-substituted ammonium salts. In some such embodiments, the N-substituted ammonium salt is mono-substituted or di-substituted, for instance with one or two alkyl groups. In some such embodiments, the N-substituted ammonium salt is tri-substituted, for instance with three alkyl groups. Exemplary alkyl groups include methyl, ethyl, propyl, butyl, and the like. In some embodiments, an ammonium salt is not a tri-substituted ammonium salt. In some embodiments, an ammonium salt is not a tetra-substituted ammonium salt.

In some embodiments, a salt is present in an aqueous fluid at a concentration in the range of 0.001 M up to saturation as measured at 20° C. In some embodiments, a salt is present in an aqueous fluid at a concentration in the range of 0.1 M to 1.0 M, or 0.2 M to 0.9 M, or 0.3 M to 0.8 M, or 0.4 M to 0.7 M, or 0.5 M to 0.6 M. In some embodiments, a salt is present in an aqueous fluid at a concentration in the range of 0.1 M to 10.0 M, or 0.5 M to 10.0 M, or 1.0 M to 10.0 M, or 1.5 M to 10. M, or 2.0 M to 10.0 M, or 2.5 M to 9.5 M, or 3.0 M to 9.0 M, or 3.5 M to 8.5 M, or 4.0 M to 8.5 M, or 4.5 M to 8.5 M, or 5.0 M to 8.5 M, or 5.5 M to 8.5 M, or 6.0 M to 8.5 M, or 6.5 M to 8.5 M, or 7.0 M to 8.0 M.

Chelants

Compositions described in this application for the controlled delivery of acid (for instance, via in situ generation) optionally comprise one or more chelants. In some embodiments, the one or more chelants is present in an aqueous fluid.

In some embodiments, a chelant comprises any agent capable of chelating one or more salts formed during the controlled delivery of acid (for example, via in situ generation).

In some embodiments, a chelant is an organic chelant.

In some embodiments, a chelant is an inorganic chelant.

Exemplary chelants include, but are not limited to, 1,2-cyclohexanediaminetetraacetic acid (CDTA), diethylenetriamineepentaacetic acid (DTPA), ethanol-diglycinic acid (EDG), ethylenediamineteraacetic acid (EDTA), L-glutamic acid N,N-diacetic acid, tetra sodium salt (GLDA), hydroxyaminocarboxylic acid (HACA), HEDTA (N-hydroxyethyl-ethylenediamine-triacetic acid), hydroxyethyleneiminodiacetate (HEIDA), N,N'-bis(carboxymethyl)glycine (NTA), sodium hexametaphosphate (SHMP), tetraammonium EDTA, and derivatives and mixtures thereof. In certain embodiments, a chelant comprises SHMP.

In some embodiments, a chelant is selected based on the particular type of ammonium salt present in a composition. For instance, in some embodiments an ammonium salt comprises a polyatomic phosphorus- or sulfur-containing counter ion and a chelant is selected from those known in the art to solubilize salts comprising polyatomic phosphorus- or sulfur-containing counter ions. Exemplary such ammonium salts comprising a polyatomic phosphorus- or sulfur-containing counter ion include, but are not limited to, ammonium persulfate, ammonium sulfate, ammonium bisulfate, ammonium phosphate, and the like. Exemplary chelants useful in compositions comprising such ammonium salts include inorganic chelants such as, for instance, SHMP. In some embodiments, a chelant is useful for chelating a metal cation. For instance, in some embodiments, a chelant is particularly good at chelating calcium salts, for instance calcium salts generated during the step of contacting a carbonate formation with a composition described in this application. In some embodiments, a chelant is particularly good at chelating magnesium salts, for instance magnesium salts generated during the step of contacting a carbonate formation with a composition described in this application. In some embodiments, a chelant is particularly good at chelating iron, for instance to control iron levels and help mitigate corrosion associated therewith. In some embodiments, a composition comprising a chelate is used to treat a subterranean formation that contains a hydrocarbon reservoir, for instance a carbonate formation. In some such embodiments, the ammonium salt is ammonium persulfate and the oxidizing agent is sodium bromate. In some such embodiments, it has been surprisingly found that SHMP exhibits a synergistic effect in that it not only chelates calcium salts to minimize precipitation but also facilitates additional dissolution of calcium carbonate, as compared to compositions in which a chelant is not present.

In some embodiments, a chelant is present in an aqueous fluid at a concentration in the range of 0.001 M up to saturation as measured at 20° C. In some embodiments, a chelant is present in an aqueous fluid at a concentration in the range of 0.005 to 0.01, or 0.005 M to 0.09 M, or 0.005 M to 0.08 M, or 0.005 M to 0.07 M, or 0.005 M to 0.06 M, or 0.005 M to 0.05 M. or 0.01 M to 0.04 M, or 0.02 M to 0.04 M, or 0.025 M to 0.04 M, or 0.03 M to 0.04 M.

In some embodiments, a chelant is present in an aqueous fluid in the range of 1 lb chelant/1000 gallons of aqueous fluid to 300 lb/1000 gallons of aqueous fluid, or 5 lb chelant/1000 gallons of aqueous fluid to 300 lb/1000 gallons of aqueous fluid, 25 lb chelant/1000 gallons of aqueous fluid to 300 lb/1000 gallons of aqueous fluid, or 50 lb chelant/1000 gallons of aqueous fluid to 300 lb/1000 gallons of aqueous fluid, or 100 lb chelant/1000 gallons of aqueous fluid to 300 lb/1000 gallons of aqueous fluid, or 200 lb chelant/1000 gallons of aqueous fluid to 300 lb/1000 gallons of aqueous fluid.

In some embodiments, an aqueous fluid comprises up to 50 wt % chelant. In some embodiments, an aqueous fluid comprises up to 45 wt % chelant. In some embodiments, an aqueous fluid comprises up to 40 wt % chelant. In some embodiments, an aqueous fluid comprises up to 35 wt % chelant. In some embodiments, an aqueous fluid comprises up to 30 wt % chelant. In some embodiments, an aqueous fluid comprises up to 25 wt % chelant. In some embodiments, an aqueous fluid comprises up to 20 wt % chelant. In some embodiments, an aqueous fluid comprises up to 15 wt % chelant. In some embodiments, an aqueous fluid comprises up to 10 wt % chelant. In some embodiments, an aqueous fluid comprises up to 5 wt % chelant.

Methods for the Controlled Delivery of Acid

In some embodiments, the present application describes methods for the controlled delivery of acid, comprising providing an aqueous fluid that comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

In some embodiments, the present application describes methods for in situ acid generation, the method comprising providing an aqueous fluid that comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

In some embodiments, the present application describes methods for in situ acid stimulation of a subterranean formation that contains a hydrocarbon reservoir, the method comprising contacting the formation with an aqueous fluid that comprises (a) an ammonium salt capable of being oxidized to produce acid and (b) an oxidizing agent capable of oxidizing the ammonium salt, where, at 1 atmosphere pressure, the ammonium salt and oxidizing agent in the aqueous fluid only react to produce acid if the temperature is at or greater than 65° C.

In some embodiments, the step of contacting comprises introducing the aqueous solution into the formation via a coiled tubing or bullheading in a production tube.

In some embodiments a method is as described in this application, where the step of contacting comprises introducing an aqueous solution of the ammonium salt and an aqueous solution of the oxidizing agent into the formation via the same tubing (for example, the same coiled tubing) and allowing the aqueous fluid to form in situ within the tubing, within the formation or within the area around the wellbore.

Alternatively, in some embodiments a method is as described in this application, where the step of contacting comprises introducing an aqueous solution of the ammonium salt and an aqueous solution of the oxidizing agent into the formation in separate stages (optionally via the same or different tubings, for example the same or different coiled tubings) and allowing the aqueous fluid to form in situ within the formation. In some embodiments, the aqueous solution of the ammonium salt is introduced into the formation first. In some embodiments, the aqueous solution of the oxidizing agent is introduced into the formation first.

Temperature

In some embodiments, controlled delivery of an acid using compositions and methods described in this application comprises controlling the temperature at which an acid is generated. For instance, in some embodiments, a composition described in this application is designed (that is, the components are selected) such that it requires a certain desired threshold temperature in order for the oxidizing agent to react with the salt to generate acid. In some embodiments, at 1 atmosphere pressure, the ammonium salt and oxidizing agent only react to produce acid if the temperature is at or greater than 65° C. For instance, in some embodiments, compositions described in this application require a temperature of at least 65° C., 70° C., 75° C., 80° C., 85° C., 90° C., 95° C., 100° C., 110° C., 120° C., 130° C., or 140° C., at 1 atmosphere pressure in order to generate acid. In some embodiments, compositions described in this application require a threshold temperature in the range of 65° C. to 250° C. at 1 atmosphere pressure in order to generate acid. In some embodiments, compositions described in this application require a threshold temperature in the range of 65° C. to 200° C. at 1 atmosphere pressure in order to generate acid. In some embodiments, compositions described in this application require a threshold temperature in the range of 65° C. to 175° C. at 1 atmosphere pressure in order to generate acid. In some embodiments, compositions described in this application require a threshold temperature in the range of 65° C. to 150° C. at 1 atmosphere pressure in order to generate acid. In some embodiments, compositions described in this application require a threshold temperature in the range of 65° C. to 125° C. at 1 atmosphere pressure in order to generate acid. In some embodiments, compositions described in this application require a threshold temperature in the range of 70° C. to 125° C. at 1 atmosphere pressure in order to generate acid. In some embodiments, compositions described in this application require a threshold temperature in the range of 75° C. to 125° C. at 1 atmosphere pressure in order to generate acid. In some embodiments, compositions described in this application require a threshold temperature in the range of 75° C. to 120° C. at 1 atmosphere pressure in order to generate acid. In some embodiments compositions described in this application require a threshold temperature in the range of 75° C. to 115° C. at 1 atmosphere pressure in order to generate acid. In some embodiments, compositions described in this application require a threshold temperature in the range of 75° C. to 110° C. at 1 atmosphere pressure in order to generate acid. In some embodiments, compositions described in this application require a threshold temperature in the range of 75° C. to 105° C. at 1 atmosphere pressure in order to generate acid. In some embodiments, compositions described in this application require a threshold temperature in the range of 80° C. to 100° C. at 1 atmosphere pressure in order to generate acid.

In some embodiments, heat required for the generation of an acid using compositions and methods described in this application occurs naturally at the location at which acid generation is desired. For instance, in some embodiments, heat comes from a subterranean formation, such as a limestone, sandstone, or shale formation. It will be appreciated that the actual threshold temperatures for generation of acid within a formation (where pressure is greater than 1 atmosphere) may be less than those recited in this application at 1 atmosphere pressure.

Other Parameters

In some embodiments, a method (or composition) is as described in this application, where the pH of the aqueous fluid at 1 atmosphere pressure and a temperature of less than 65° C., is greater than 5. In some such embodiments, the pH is greater than 6. In some such embodiments, the pH is greater than 7. In some such embodiments, the pH is greater than 8.

In some embodiments, the present application describes methods for in situ acid stimulation of a subterranean formation that contains a hydrocarbon reservoir, where the formation comprises carbonates. In some embodiments, the present application describes methods for in situ acid stimulation of a subterranean formation that contains a hydrocarbon reservoir, where the formation comprises sandstone. In some embodiments, the present application describes methods for in situ acid stimulation of a subterranean formation that contains a hydrocarbon reservoir, where the formation comprises shale.

In some embodiments, a method (or composition) is as described in this application, where the ammonium salt comprises a salt selected from the group consisting of ammonium halides, ammonium sulfate, ammonium nitrate, ammonium phosphate, ammonium carbonate, and mixtures thereof. In some embodiments, the ammonium salt comprises ammonium chloride. In some embodiments, the ammonium salt comprises ammonium persulfate. In some such embodiments, the ammonium salt is present in the aqueous fluid at a concentration in the range of 0.001 M up to saturation.

In some embodiments, a method (or composition) is as described in this application, where the oxidizing agent comprises an agent selected from the group consisting of a peroxide, a persulfate salt, a permanganate salt, a bromate salt, and mixtures thereof. In some such embodiments, the oxidizing agent comprises a bromate salt. In some such embodiments, the oxidizing agent comprises sodium bromate. In some such embodiments, the oxidizing agent is present in the aqueous fluid at a concentration in the range of 0.001 M up to saturation.

In some embodiments, a method (or composition) is as described in this application, where the aqueous fluid further comprises a chelant. Exemplary such chelants are described above. In some such embodiments, the chelant is used to sequester calcium salt, for instance, such as those generated from in situ acid stimulation of a calcium carbonate formation. In some such embodiments, the ammonium salt comprises a salt selected from the group consisting of ammonium persulfate, ammonium sulfate, ammonium bisulfate, ammonium phosphate and mixtures thereof. In some such embodiments, the chelant is selected from the group consisting of 1,2-cyclohexanediaminetetraacetic acid (CDTA), diethylenetriamineepentaacetic acid (DTPA), ethanol-diglycinic acid (EDG), ethylenediamineteraacetic acid (EDTA), N,N'-bis(carboxymethyl)glycine (NTA), L-glutamic acid N,N-diacetic acid, tetra sodium salt (GLDA), HEDTA (N-hydroxy ethyl-ethylenediamine-triacetic acid), hydroxyaminocarboxylic acid (HACA), hydroxyethyleneiminodiacetate (HEIDA), and sodium hexametaphosphate (SHMP), and derivatives and mixtures thereof.

In certain embodiments, the chelant is sodium hexametaphosphate (SHMP) and the ammonium salt comprises ammonium persulfate.

In some embodiments, a method (or composition) is as described in this application, where the aqueous fluid does not contain a free tertiary amine salt or a compound which reacts to form a free tertiary amine salt in situ. For instance, in some such embodiments, the aqueous fluid does not comprise a trialkylamine such as trimethylamine, triethylamine, tri-n-propylamine, tri-n-butyl-amine, dimethyldodecylamine, or dimethyltetradodecylamine.

EXAMPLES

In order that the application may be more fully understood, the following examples are set forth. It should be understood that these examples are for illustrative purposes only and are not to be construed as limiting in any manner.

Example 1. Dissolution of $CaCO_3$ Using In Situ Generated Strong Mineral Acids

Certain abbreviations shown in Table 1 are used in this example:

TABLE 1

| Compound | Formula | Abbreviation |
|---|---|---|
| Ammonium persulfate | $(NH_4)_2S_2O_8$ | APS |
| Ammonium chloride | $NH_4Cl$ | AC |
| Ammonium fluoride | $NH_4F$ | AF |
| Sodium bromate | $NaBrO_3$ | SB |
| Sodium hexametaphosphate | $(NaPO_3)_6$ | SHMP |
| Calcium carbonate | $CaCO_3$ | — |

In the following examples, the abbreviation "g" stands for grams, the abbreviation "mL" stands for milliliters, and the abbreviation "ppm" stands for parts per million and can also be expressed as milligrams per liter.

APS & SB: An aqueous solution containing 0.5 g APS and 0.5 g SB in 25 mL of water were prepared in a glass tube. 0.10 g of $CaCO_3$ was added to the mixture. The tube was then sealed and placed in a recirculating oil heating bath at 100° C. After heating for 6 hours, the reaction vessel was cooled to room temperature. The liquid was isolated and analyzed via inductively coupled plasma (ICP) to determine the concentration of calcium in solution (953 ppm) which corresponds to 60% of available $Ca^{2+}$ in solution. ($CaSO_4$ precipitation was observed.)

APS, SB & SHMP: An aqueous solution containing 0.25 g APS, 0.25 g SB, and 0.5 g SHMP in 25 mL of water were prepared in a glass tube. 0.10 g $CaCO_3$ was added to the mixture. The tube was sealed and placed in an oil heating bath at 100° C. After heating for 1 hour, the reaction vessel was cooled to room temperature. The liquid was isolated and was analyzed via inductively coupled plasma (ICP) to determine the concentration of calcium in solution (1210 ppm) which corresponds to 76% of available $Ca^{2+}$ in solution. This example demonstrates the surprising and unexpected finding a synergistic effect is observed with the combination of APS, SB, and SHMP. That is, SHMP appears to not only chelate $CaSO_4$, but also to facilitate dissolution of $CaCO_3$ as compared to an otherwise identical aqueous solution containing no SHMP.

AC & SB: An aqueous solution of 0.75 g SB and 0.75 g of AC in 25 mL of water was prepared in a 120 mL glass tube. The pH was measured to be 6.5. The tube was sealed and placed in a heating bath at 150° C. for 2 hours. The tube was then cooled to room temperature, and the pH was determined to be 1.07. Then, 0.5 g of crushed calcite (Indiana limestone rock) was added to the tube. Vigorous dissolution occurred, and the solution was reheated to 150° C. in an oil bath to ensure the reaction went to completion. After cooling the system to room temperature, the liquid was isolated and analyzed via inductively coupled plasma (ICP) to determine the concentration of calcium in solution (8070 ppm) which corresponds to 100% of available $Ca^{2+}$ in solution.

AF & SB: An aqueous solution of 0.5 g sodium bromate and 0.5 g of ammonium fluoride in 25 mL of water was prepared in a 125 mL autoclave reactor. The autoclave was sealed and placed in an oven at 250° C. for 8 hours. The autoclave was then cooled to room temperature, and the pH was determined to have dropped to 3 indicating the formation of acid. Notably, the pH of this system can be fined tuned through prolonged heating of the fluid system.

Example 2. Using In Situ Generated Strong Mineral Acids to Treat Filter Cakes

Filter cakes were prepared using a high temperature high pressure (HTHP) filter press and water-based drilling mud (WBM). WBM was formulated to a density of 9.58 lb/gal using a Fann Multi-Mixer to combine deionized water (DI-$H_2O$, 308.2 mL), Defoamer 7500 L (2.0 mL), BARABUF (1.0 g), xanthan gum (0.50 g), N-VIS P PLUS (4.0 g), NaCl (58.7 g), $CaCo_3$ (<4 μm; 10.0 g), and $CaCO_3$ (20 μm; 20.0 g). A HTHP filter press was then used to form the filter cakes. A 3 μm disk was saturated with 2% KCl. 100 mL of WBM was then added to the autoclave. The disk was then secured and loaded into the autoclave before the temperature was set. 300 psi was applied and the filter cake was allowed to build for 16 hours.

Filter cakes were then spot treated with an exemplary aqueous fluid of the present application that included a mixture of $NH_4Cl$ (2.00 g), $NaBrO_3$ (2.83 g), DI-$H_2O$ (32.5 mL). Filter cakes remained exposed to the aqueous fluid for one hour. At 25° C. and 60° C., the pH of the aqueous fluid was in the range of 6-7 and filter cakes dissolved to yield a calcium measured at a concentration of about 85 ppm (i.e, corresponding to less than about 1 mg dissolved calcium carbonate). At 120° C., the pH of the aqueous fluid was 0 and the calcium carbonate dissolution was more pronounced with filter cakes dissolving to yield a calcium measured at a concentration of about 352 ppm (i.e., corresponding to about 27 mg dissolved calcium carbonate). This establishes that a temperature triggered in situ acid system of the present application can be used to dissolve calcium carbonate in filter cakes as a means to improve permeability.

Other Embodiments

Certain embodiments of the present application were described supra. It is, however, expressly noted that the application is not limited to those embodiments, but rather the intention is that additions and modifications to what was expressly described in the present disclosure are also included within the scope of the application. Moreover, it is to be understood that the features of the various embodiments described in the present disclosure were not mutually exclusive and can exist in various combinations and permutations, even if such combinations or permutations were not made express, without departing from the spirit and scope of the application. Therefore, the disclosure should not be limited to certain implementations, but rather should be limited only by the spirit and scope of the following claims.

What is claimed is:

1. A method for in situ acid stimulation of a subterranean formation that contains a hydrocarbon reservoir, the method comprising contacting the subterranean formation with an aqueous fluid that comprises (a) an ammonium salt capable of being oxidized to produce an acid; and (b) an oxidizing agent capable of oxidizing the ammonium salt, where the ammonium salt and the oxidizing agent form an acid when reacted at a temperature of 65° C. or greater to produce the acid.

2. The method of claim 1, where the subterranean formation comprises carbonates.

3. The method of claim 1, where the subterranean formation comprises sandstone.

4. The method of claim 1, where the subterranean formation comprises shale.

5. The method of claim 1, where the ammonium salt comprises a salt selected from the group consisting of ammonium halides, ammonium sulfate, ammonium nitrate, ammonium phosphate, ammonium carbonate, and mixtures thereof.

6. The method of claim 1, where the ammonium salt comprises ammonium chloride.

7. The method of claim 1, where the ammonium salt comprises ammonium persulfate.

8. The method of claim 1, where the oxidizing agent comprises an agent selected from the group consisting of a peroxide, a persulfate salt, a permanganate salt, a bromate salt, a perbromate salt, a chlorate salt, a perchlorate salt, an iodate salt, a periodate salt, and mixtures thereof.

9. The method of claim 1, where the oxidizing agent comprises a bromate salt.

10. The method of claim 1, where the oxidizing agent comprises sodium bromate.

11. The method of claim 1, where the aqueous fluid further comprises a chelant.

12. The method of claim 11, where the subterranean formation comprises carbonates.

13. The method of claim 12, where the ammonium salt comprises a salt selected from the group consisting of ammonium persulfate, ammonium sulfate, ammonium hydrogen sulfate, ammonium thiosulfate, ammonium bisulfate, ammonium phosphate, ammonium monohydrogen phosphate, ammonium dihydrogen phosphate, ammonium phosphite, ammonium nitrite, and mixtures thereof.

14. The method of claim 11, where the chelant is selected from the group consisting of 1,2-cyclohexanediaminetetraacetic acid (CDTA), diethylenetriamineepentaacetic acid (DTPA), ethanol-diglycinic acid (EDG), ethylenediamineteraacetic acid (EDTA), N,N'-bis(carboxymethyl)glycine (NTA), L-glutamic acid N,N-diacetic acid, tetra sodium salt (GLDA), HEDTA (N-hydroxyethyl-ethylenediamine-triacetic acid), hydroxyaminocarboxylic acid (HACA), hydroxyethyleneiminodiacetate (HEIDA), and sodium hexametaphosphate (SHMP), and derivatives and mixtures thereof.

15. The method of claim 11, where the chelant is sodium hexametaphosphate and the ammonium salt comprises ammonium persulfate.

16. The method of claim 1, where the ammonium salt is present in the aqueous fluid at a concentration in a range of 0.001 M to saturation.

17. The method of claim 1, where the oxidizing agent is present in the aqueous fluid at a concentration in a range of 0.001 M to saturation.

18. The method of claim 1, where at 1 atmosphere of pressure, the ammonium salt and oxidizing agent in the aqueous fluid form an acid when reacted at a temperature greater than or equal to 80° C.

19. The method of claim 1, where at 1 atmosphere of pressure, the ammonium salt and oxidizing agent in the aqueous fluid form an acid when reacted at a temperature or greater than or equal to 100° C.

20. The method of claim 1, where the aqueous fluid has a pH greater than 5.

21. The method of claim 1, where the aqueous fluid does not contain a free tertiary amine salt or a compound which reacts to form a free tertiary amine salt in situ.

22. The method of claim 1, where the step of contacting comprises introducing the aqueous solution into the formation via a coiled tubing or bullheading in a production tube.

23. The method of claim 1, where the step of contacting comprises introducing a first solution comprising the ammonium salt and a second solution comprising the oxidizing agent into the formation via the same tubing and allowing the aqueous fluid to form in situ within the tubing, within the subterranean formation or within the area around the wellbore.

24. The method of claim 1, where the step of contacting comprises introducing a first solution comprising the ammonium salt and a second solution comprising the oxidizing agent into the formation in separate stages and allowing the aqueous fluid to form in situ within the formation.

25. An aqueous fluid for in situ acid stimulation of a subterranean formation that contains a hydrocarbon reservoir, where the aqueous fluid comprises (a) an ammonium salt capable of being oxidized to produce an acid; and (b) an oxidizing agent capable of oxidizing the ammonium salt, where the ammonium salt and the oxidizing agent form an acid when reacted at a temperature of 65° C. or greater to produce the acid.

26. A method for in situ acid treatment of a subterranean formation selected from a water injection well, a gas injection well, a water disposal well, and a drill cuttings disposal well, the method comprising contacting the formation with an aqueous fluid that comprises (a) an ammonium salt capable of being oxidized to produce an acid; and (b) an oxidizing agent capable of oxidizing the ammonium salt, where the ammonium salt and the oxidizing agent form an acid when reacted at a temperature of 65° C. or greater to produce the acid.

27. An aqueous fluid for in situ acid treatment of a subterranean formation selected from a water injection well, a gas injection well, a water disposal well, and a drill cuttings disposal well, where the aqueous fluid comprises (a)

an ammonium salt capable of being oxidized to produce an acid; and (b) an oxidizing agent capable of oxidizing the ammonium salt, where the ammonium salt and the oxidizing agent form an acid when reacted at a temperature of 65° C. or greater to produce the acid.

* * * * *